(12) United States Patent
Dorenbosch et al.

(10) Patent No.: US 7,817,599 B2
(45) Date of Patent: Oct. 19, 2010

(54) METHOD AND APPARATUS FOR PROVIDING SEAMLESS MOBILITY ACROSS MULTICAST DOMAINS

(75) Inventors: Jheroen P. Dorenbosch, Paradise, TX (US); Cynthia M. Jung, Menlo Park, CA (US)

(73) Assignee: Motorola-Mobility, Inc., Libertyville, IL (US)

( * ) Notice: Subject to any disclaimer, the term of this patent is extended or adjusted under 35 U.S.C. 154(b) by 732 days.

(21) Appl. No.: 11/235,503

(22) Filed: Sep. 26, 2005

(65) Prior Publication Data

US 2007/0070946 A1   Mar. 29, 2007

(51) Int. Cl.
*H04Q 7/00* (2006.01)
(52) U.S. Cl. ............. 370/331; 455/436; 455/422.1; 455/432; 455/435.1; 455/132.1; 455/445; 455/433; 370/349; 370/345; 370/401; 370/352; 370/338; 370/313; 370/351; 370/353; 370/310.2; 370/328.3; 709/238; 709/204
(58) Field of Classification Search .............. 455/435.1, 455/436, 422.1, 432.2, 432.1, 455, 433; 370/235, 370/338, 254, 255, 351, 331, 330, 401, 439, 370/313, 328, 349, 340.2, 353, 352, 345, 370/310.2; 709/238, 203, 204
See application file for complete search history.

(56) References Cited

U.S. PATENT DOCUMENTS 6,988,146 B1 * 1/2006 Magret et al. ............... 709/238
7,031,288 B2 * 4/2006 Ogier ......................... 370/338
7,203,492 B2 * 4/2007 Momona .................. 455/432.1
7,299,044 B2 * 11/2007 Ikeda et al. .................. 455/436
7,339,903 B2 * 3/2008 O'Neill ....................... 370/313
7,349,369 B2 * 3/2008 Tsirtsis et al. ............... 370/328
7,474,650 B2 * 1/2009 O'Neill ....................... 370/349
2002/0062388 A1 * 5/2002 Ogier et al. ................. 709/238
2003/0018715 A1 * 1/2003 O'Neill ....................... 709/204
2003/0095504 A1 * 5/2003 Ogier ......................... 370/235
2003/0104807 A1 * 6/2003 Momona ..................... 455/422
2004/0176095 A1 * 9/2004 Yamada et al. .............. 455/445
2005/0101321 A1 * 5/2005 Ikeda et al. ............... 455/435.1
2005/0271032 A1 * 12/2005 Yun et al. .................... 370/349

* cited by examiner

*Primary Examiner*—Rafael Pérez-Gutiérrez
*Assistant Examiner*—Joseph Arevalo (57) ABSTRACT

A mobile station (303) provides seamless mobility across multicast domains for communicating with a multicast group (109) in a telecommunication system (300) that includes a home domain (102) and a visited domain (302). The mobile station (303) includes a local source address (324) and a home address (322). The mobile station (303) also includes a domain detector (305) for detecting a current domain of the mobile station (303), a comparator (307) for comparing the current domain of the mobile station with a previous domain of the mobile station (303) to generate a comparison result; and a multicast mode switch (326) coupled to the comparator (307) for switching between the local source address (324) and the home address (322) to select a source address for communicating with the multicast group (109) as a function of the comparison result.

10 Claims, 5 Drawing Sheets

METHOD AND APPARATUS FOR PROVIDING SEAMLESS MOBILITY ACROSS MULTICAST DOMAINS

FIELD OF THE INVENTION

The present invention relates generally to Mobile Internet Protocol (MIP) and multicast telecommunication systems. More specifically, but without limitation thereto, the present invention relates to providing Internet Protocol connectivity for a mobile station roaming across multiple multicast domains.

BACKGROUND OF THE INVENTION

Mobile Internet Protocol (MIP) provides the capability to maintain Internet Protocol (IP) connectivity as a Mobile Station (MS) changes connectivity points in an MIP network. MIP operation generally includes a Home Agent (HA) that resides on the network, a Mobile Internet Protocol client residing in the Mobile Station, and optionally a Foreign Agent that resides in a network into which the Mobile Station may roam.

Internet Protocol (IP) multicast is a well-known communication mode that may be used to allow a group of Mobile Stations to send and receive messages using Push-To-Talk (PTT) protocol within the multicast group. A general problem with IP multicast is that the number of multicast addresses is limited, and each domain or network may assign multicast addresses independently. Consequently, neighboring domains and networks may use the same multicast address for different purposes. When a Mobile Station that is using a multicast address in one domain roams into a neighboring domain or network, the Mobile Station may not be able to continue to use the same multicast address. In the context used herein, the term domain refers specifically to a multicast domain, which may or may not correspond to an Internet Protocol (IP) domain or a Mobile Internet Protocol (MIP) domain.

When a Mobile Station that uses Mobile Internet Protocol (MIP) roams from one domain into another, the Mobile Station attempts to locate a Foreign Agent (FA) in the other domain. If a Foreign Agent is found, the Mobile Station communicates with the Home Agent using the address of the Foreign Agent as a Care-of Address (CoA). A reverse tunnel is set up between the Foreign Agent and the Home Agent so that the Mobile Station can rejoin the multicast group using its home address.

DESCRIPTION OF THE SEVERAL VIEWS OF THE DRAWINGS

The following drawings are presented by way of example and not limitation, wherein like references indicate similar elements throughout the several views of the drawings, and wherein.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that are useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific sequence; however, practitioners of the art will understand that the specific sequence is not a requirement. Also, the terms and expressions used in the description have the ordinary meanings accorded to such terms and expressions in the corresponding respective areas of inquiry and study except where other meanings have been specifically set forth herein.

Pursuant to the following teachings, a mobile station may automatically switch between a local source address and a home address when the Mobile Station roams between a home domain and a visited domain to provide seamless mobility across multicast domains, that is, a Mobile Station can continue to transmit and receive communications with members of a multicast group without interruption when the Mobile Station roams out of the home domain and when the Mobile Station returns to the home domain.

Prior to describing various embodiments for automatically switching between a local source address and a home address when the Mobile Station roams between a home domain and a visited domain, certain relevant aspects of the prior art are briefly described.

Figure 1:
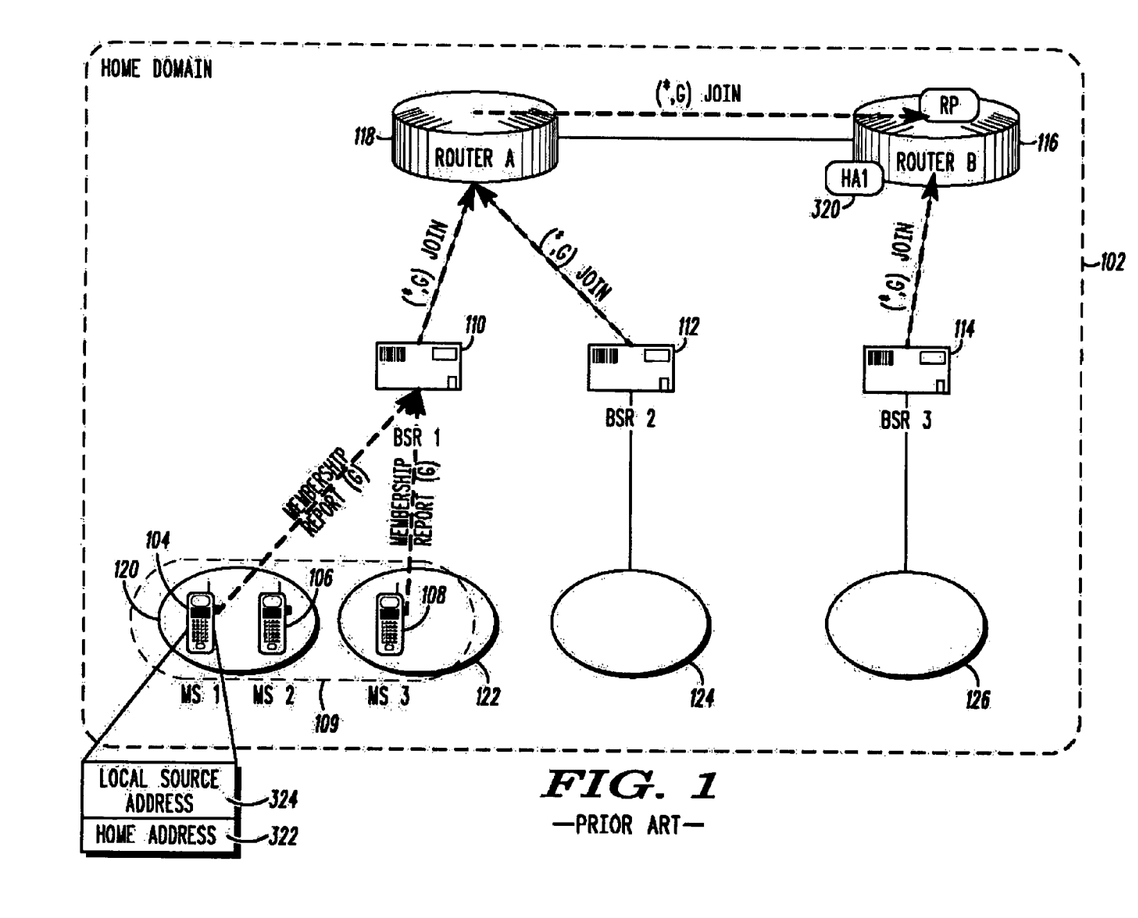
FIG. 1 illustrates a diagram of a simplified Mobile Internet Protocol (MIP) telecommunication system according to the prior art.

FIG. 1 illustrates a diagram of a simplified Mobile Internet Protocol (MIP) telecommunication system 100 according to the prior art. Shown in FIG. 1 are a home domain 102, Mobile Stations 104, 106, and 108, a multicast group 109, Base Station Routers (BSR) 110, 112, and 114, multicast routers 116 and 118, subnets 120, 122, 124, and 126, a Home Agent 320, a home address 322, and a local source address 324. The term subnet is intended to include sectors and cells that refer to a geographically defined region covered by or serviced by one of the Base Station Routers (BSR) 110, 112, and 114. As used herein, the term Base Station Router includes all devices used to support or service an Internet Protocol subnet in multicast mode in a Mobile Internet Protocol (MIP) network. For example, each of the Base Station Routers (BSR) 110, 112, and 114 may be a multicast-capable router that supports Mobile Internet Protocol by providing a Foreign Agent capability.

In FIG. 1, the Mobile Stations 104, 106, and 108 select or are assigned to the Home Agent 320 and are each assigned a unique home address 322 in the home domain 102. In the example of FIG. 1, the Home Agent 320 is colocated with the multicast router 116. The Home Agent 320 may also be implemented on other routers or system resources according to well-known Mobile Internet Protocol (MIP) techniques.

The Mobile Stations 104, 106, and 108 are also assigned the local source address 324 for use inside the home domain 102. The Mobile Stations 104, 106, and 108 may use the local source address 324, for example, to obtain Mobile Internet Protocol mobility when moving from one service area to another covered by the Base Station Routers (BSR) 110, 112, and 114. The local source address 324 may change as the Mobile Stations 104, 106, and 108 move from the service area covered by one the Base Station Routers (BSR) 110, 112, and 114 to another. Within the home domain 102, the multicast group G 109 is identified by a multicast address (not shown). The Mobile Stations 104, 106, and 108 join the multicast group G 109 with a message such as an Internet Group Management Protocol (IGMP) membership report that specifies the multicast address of the multicast group G 109. As used herein, the term Mobile Station includes all devices capable of communicating in multicast mode in a Mobile Internet Protocol (MIP) network. For example, each of the Mobile Stations 104, 106, and 108 may be a mobile handset, a desktop computer, or a combination of various devices capable of communicating in multicast mode in a Mobile Internet Protocol (MIP) network.

The Base Station Router (BSR) 110 receives the IGMP membership report from the Mobile Stations 104 and 108. Each of the designated Base Station Routers (BSR) 110 and 112 sends a message such as a (*.G) message to the Rendezvous Point (RP) router 116 via the multicast router 118 to instantiate the Rendezvous Point Tree (RPT) using, for example, Protocol Independent multicast-Sparse Mode (PIM-SM). The designated Base Station Router 114 sends a similar (*.G) message directly to the Rendezvous Point (RP) router 116. The Base Station Router (BSR) 110 advertises the local source address 324 and assigns the local source address 324 to the Mobile Station 104 that accepts the local source address 324 for communicating with the multicast group G 109 within the home domain 102. The home address 322 is assigned to the Mobile Station 104 for communicating with targets in unicast mode. The targets may be, for example, individual Mobile Stations outside the multicast group G 109 (not shown). The home address 322 may also be used as the source address to communicate with members of the multicast group G 109 individually when the destination is unicast.

The Rendezvous Point Tree (RPT) defines the paths from the Rendezvous Point (RP) multicast router 116 to each network segment where a member of multicast group G 109 is located. Message traffic then flows from the transmitting Mobile Station 104 upstream to the Rendezvous Point (RP) multicast router 116 and downstream to each of the receiving Mobile Stations 106 and 108. To reduce the delay between the transmitting Mobile Station 104 and the receiving Mobile Stations 106 and 108, the Rendezvous Point Tree (RPT) may be pruned to generate the Shortest Path Tree (SPT) as illustrated in FIG. 2.

Figure 2:
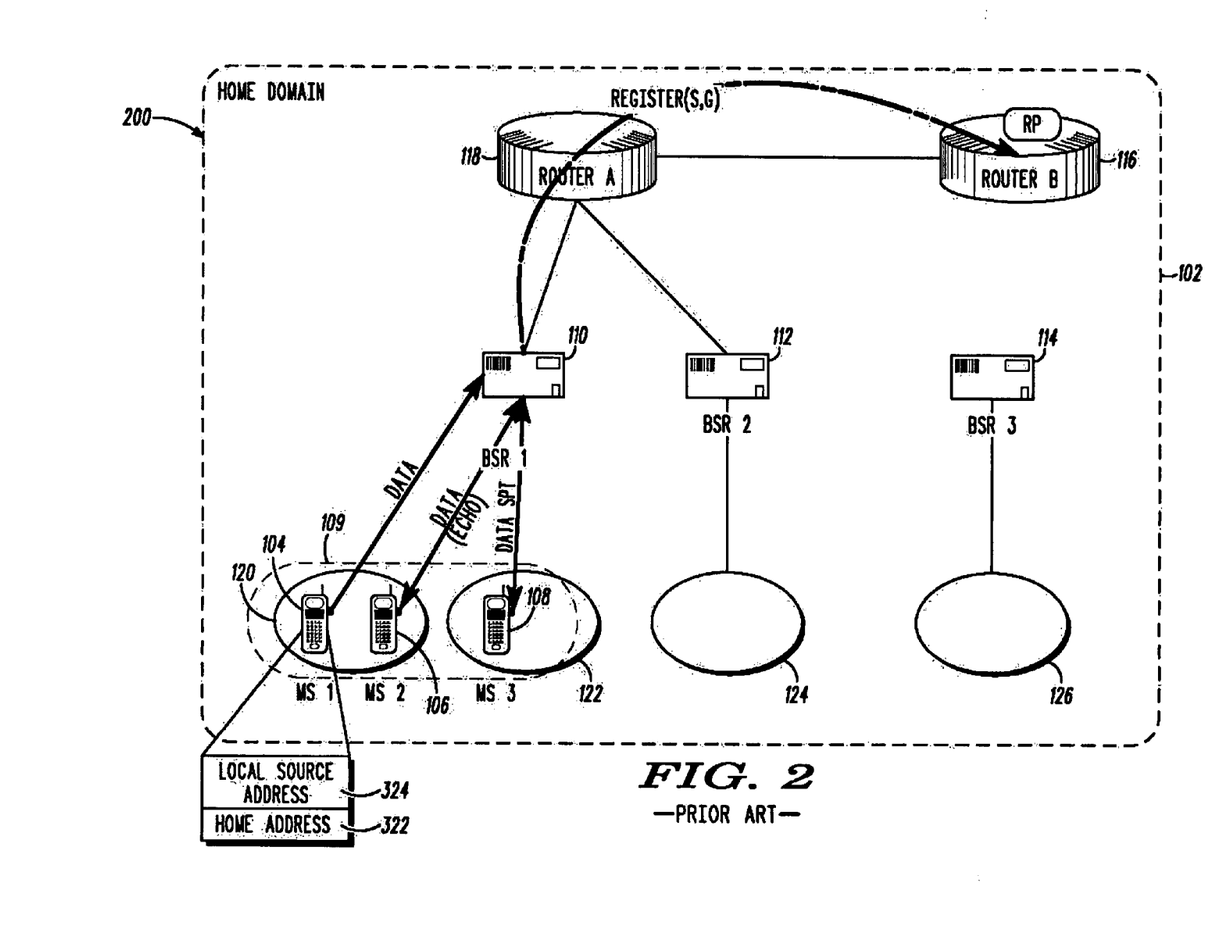
FIG. 2 illustrates a diagram of the Mobile Internet Protocol (MIP) telecommunication system of FIG. 1 in which the Rendezvous Point Tree (RPT) has been pruned to reduce the delay between the transmitting Mobile Station and the receiving Mobile Stations according to the prior art.

FIG. 2 illustrates a diagram of the Mobile Internet Protocol (MIP) telecommunication system 200 of FIG. 1 in which the Rendezvous Point Tree (RPT) has been pruned to reduce the delay between the transmitting Mobile Station and the receiving Mobile Stations according to the prior art. Shown in FIG. 2 are a home domain 102, Mobile Stations 104, 106, and 108, a multicast group 109, Base Station Routers (BSR) 110, 112, and 114, routers 116 and 118, subnets/sectors/cells 120, 122, 124, and 126, a Home Agent 320, a home address 322, and a local source address 324.

In FIG. 2, pruning the Rendezvous Point Tree (RPT) removes the downlink from the multicast router 116 to the Base Station Router 110. After a few message packets have been transmitted, all traffic for a dispatch transmission has disappeared from the links between the Rendezvous Point (RP) multicast router 116, the multicast router 118, and the Base Station Router 110. The extent of the pruning that may be performed depends on the configuration of the Mobile Stations in the multicast group, and may include additional Base Station Routers and multicast routers.

As long as the Mobile Stations 104, 106, and 108 move only within the home domain 102, they may continue to use the local source address 324 to communicate with the multicast address of the multicast group G 109. The local source address 324 is a unicast address that may be used as a source Internet Protocol (IP) address when the Mobile Station 104 is sending a message packet to the multicast group 109. The local source address 324 of the Mobile Station 104 is taken from one of the subnets/sectors/cells 120 and 122 attached to the Base Station Router (BSR) 110 or some virtual subnet and address range that the routing system delivers to one of the Base Station Routers (BSR) 110, 112, and 114. As the Mobile Stations 104, 106, and 108 move from one of the subnets/sectors/cells 124 and 126 to another, the local source address 324 changes. As the Mobile Station 104 moves from one of the subnets/sectors/cells 120 and 122 to another, the local source address 324 may or may not change, depending on whether the sectors 120 and 122 are part of a common Internet Protocol (IP) subnet.

If one of the Mobile Stations 104, 106, and 108 roams out of the home domain into a visited domain, the multicast address of the multicast group G 109 used in the home domain 102 may conflict with a local multicast address used in the visited domain. Absent a protocol for determining whether a specific local source address is or will be used in the future by the visited domain for another purpose, the roaming Mobile Station 104 may safely assume that the multicast address of the multicast group G 109 used in the home domain 102 is reserved for another purpose in the visited domain, for example, to identify a different multicast group. Accordingly, it is desirable to avoid a conflict between the local multicast address used by the visited domain and the same multicast address of the multicast group G 109 used by the roaming Mobile Station 104. In addition, it is desirable to avoid interrupting communications among the multicast group G 109 not only when the Mobile Station 104 roams from one subnet to another within the home domain, but also when the Mobile Station 104 roams from one domain into another.

A conflict between the multicast address of the multicast group G 109 used in the home domain with the address space used in the visited domain may be avoided while providing seamless mobility across multicast domains as follows. In one embodiment, a mobile station provides seamless mobility across multicast domains for communicating with a multicast group in a telecommunication system that includes a home domain and a visited domain. The mobile station includes a local source address and a home address. The mobile station also includes a domain detector for detecting a current domain of the mobile station, a domain comparator for comparing the current domain of the mobile station with a previous domain of the mobile station to generate a comparison result; and a multicast mode switch coupled to the comparator for switching between the local source address and the home address to select a source address for communicating with the multicast group as a function of the comparison result.

Figure 3:
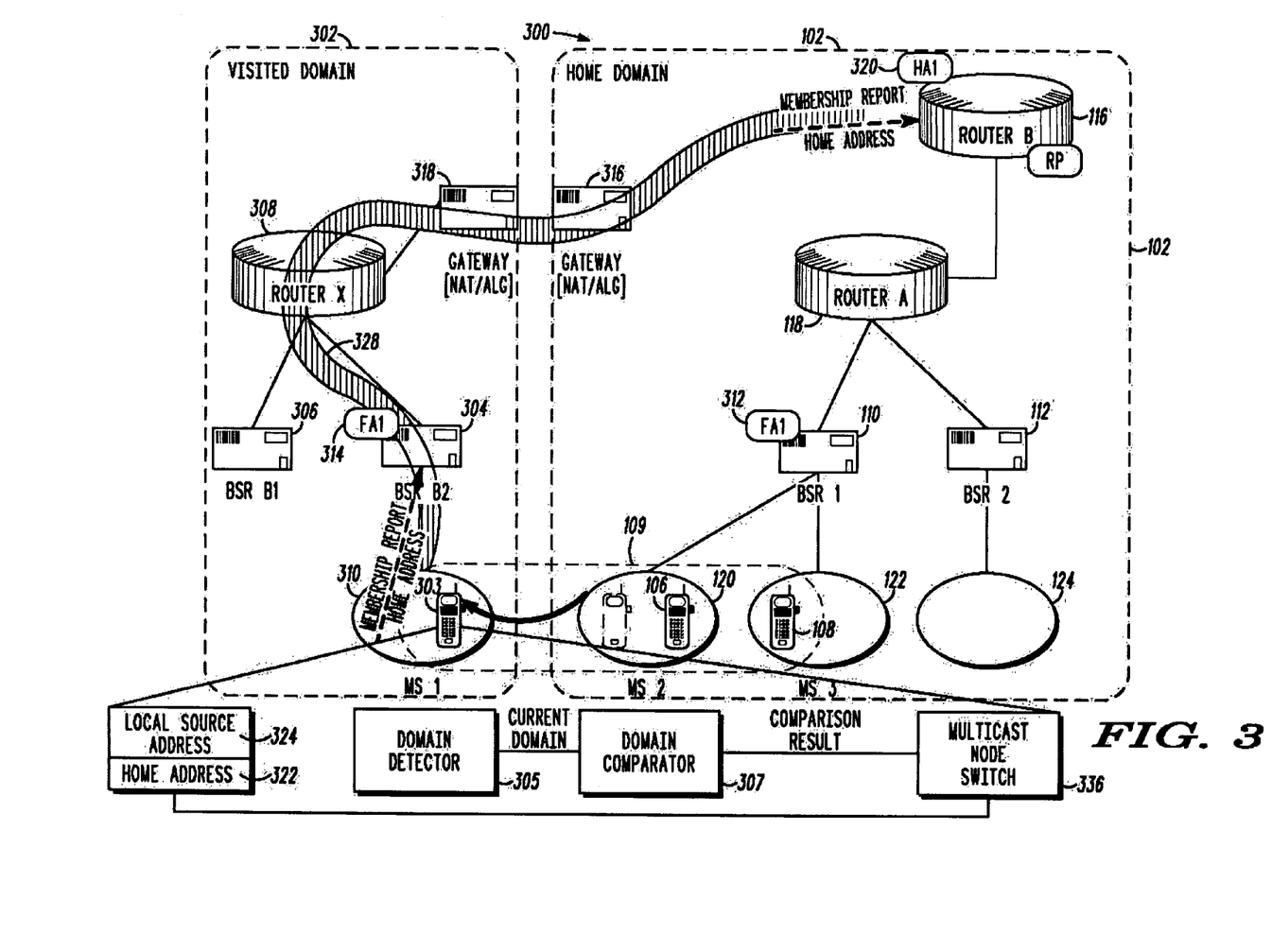
FIG. 3 illustrates a diagram of a Mobile Station that roams from its home domain into a visited domain.

FIG. 3 illustrates a diagram 300 of a Mobile Station that roams from its home domain into a visited domain. Shown in FIG. 3 are a home domain 102, multicast routers 116 and 118, a visited domain 302, Mobile Stations 106, 108, and 303, Base Station Routers (BSR) 110, 112, 304, and 306, a router 308, sectors or subnets 120, 122, 124, and 310, Foreign Agents (FA) 312 and 314, gateways or firewalls 316 and 318, a Home Agent (HA) 320, a home address 322, a local source address 324, and a reverse tunnel 328. As described below, the mobile station 303 may include a domain detector 305, a domain comparator 307, and a multicast mode switch 326.

In the example of FIG. 3, the router 308 may or may not be a multicast router, and the Home Agent (HA) 320 is colocated with the multicast router 116. The Home Agent (HA) 320 may also be implemented on other routers or system resources according to well-known Mobile Internet Protocol (MIP) techniques. The Mobile Station 303 differs significantly from the Mobile Station 104 in FIG. 1. Specifically, the Mobile Station 303 includes the domain detector 305, the domain comparator 307, and the multicast mode switch 326 in addition to the home address 322, the multicast address of the multicast group G 109, and the local source address 324. The domain detector 305, the domain comparator 307, and the multicast mode switch 326 may be embedded as a part of the programming of the mobile station 303 or may be configured as a hardware component of the mobile station 303.

The home domain 102 and the visited domain 302 generally use different Internet Protocol (IP) address spaces and are typically connected via gateways and/or firewalls 316 and 318 as shown in FIG. 3. The visited domain 302 may also use the same local source address 324 used by the Mobile Station 303 for a different purpose. The home address 322 used by the mobile station 303 in the visited domain is identical to the home address used by the Mobile Station 104 of FIG. 1 in its home domain 102. One of the advantages of the present invention is that when in the visited domain 104, the mobile station may use the same home address 322 as when the mobile station is in the home domain 102. When the Mobile Station 303 roams from the subnet 120 inside the home domain 102 into the subnet 310 inside the visited domain 302, the Mobile Station 303 may use the Foreign Agent (FA) 314 in the visited domain 302 and the home address 322 to rejoin the multicast group 109 by a reverse tunnel.

The reverse tunnel 328 may be set up according to well-known Mobile Internet Protocol (MIP) techniques to route message traffic for the Mobile Station 303 and the Mobile Stations 106 and 108 in the multicast group 109. The reverse tunnel 328 for the Mobile Station 303 traverses the router 308 in the visited domain 302, the gateways/firewalls 316 and 318 that connect the visited domain 302 with the home domain 102, and the Home Agent (HA) 320. The reverse tunnel 328 is used to transmit messages from the Mobile Station 303 in the multicast group 109 to destinations such as the Rendezvous Point (RP) multicast router 116, the multicast router 118, and the Mobile Stations 106 and 108 in the home domain 102. The Mobile Station 303 may receive messages from the Mobile Stations 106 and 108 in the multicast group 109 using a forward tunnel that traverses the same path as the reverse tunnel 328 in the opposite direction according to well-known Mobile Internet Protocol (MIP) techniques.

The delays involved with rejoining the multicast group 109 when the Mobile Station 303 roams from the home domain 102 into the visited domain 302 and when the Mobile Station 303 roams in the reverse direction may be advantageously reduced by a method of switching automatically between the local source address 324 and the home address 322 as described below.

The Mobile Station 303 initially defines a previous domain, for example, as the home domain 102. The Mobile Station 303 includes the domain detector 305 that detects the current domain, for example, by receiving a subnet identifier over a broadcast channel of the telecommunication system that identifies the current domain. The subnet identifier may contain the name of the current domain, or the subnet identifier may contain a number or character string that identifies the current domain. Subnets of the same domain generally use subnet identifiers that contain the same domain identifier.

The current domain is the domain that contains the subnet to which the Mobile Station 303 is connected. For example, if the Mobile Station 303 is connected via a subnet inside the home domain 102, then the current domain is the home domain 102. As long the domain detector 305 detects that the Mobile Station 303 is connected to a subnet or cell or sector within the home domain 102, then the Mobile Station 303 continues to operate in the same manner as in FIG. 1 using the local source address 324, even when the Mobile Station roams from one subnet or cell or sector to another within the home domain 102, although the local source address 324 may vary throughout the home domain 102 each time the Mobile Station 303 moves between the sectors or subnets 120, 122, and 124 that are attached via different Base Station Routers (BSR) 110 and 112. The Mobile Station 303 continues to use the local source address 324 when sending multicast message packets to the multicast group G 109 within the home domain 102.

The Mobile Station 303 also includes the domain comparator 307 that compares the previous domain with the current domain to generate a comparison result. When the Mobile Station 303 roams from the home domain 102 into the visited domain 302, the domain detector 305 detects the visited domain 302 and sets the current domain equal to the visited domain 302. If the comparison result indicates that the subnet is not inside the previous domain, then the multicast mode switch 326 immediately switches from the local source address 324 to the home address 322 of the home domain 102 to select a source address for communicating with the multicast group. The Mobile Station 303 uses the home address 322 to register with a Foreign Agent (FA) 314 in the visited domain 302 that supports reverse tunneling. Mobile Internet Protocol (MIP) always creates a forward tunnel and provides the option of creating a reverse tunnel. The Mobile Station 303 sets up the reverse tunnel 328 to the Home Agent (HA) 320 via the Foreign Agent (FA) 314 to rejoin the multicast group 109 according to well-known Mobile Internet Protocol (MIP) techniques. The reverse tunnel 328 may originate from the Mobile Station 303, for example, using a colocated Care-of-Address (CoA).

Alternatively, the reverse tunnel 328 may originate from the Foreign Agent (FA) 314 in the visited domain 302 using the Care-of-Address (CoA) of the Foreign Agent (FA) 314 in the visited domain 302. The Mobile Station 303 uses the reverse tunnel 328 to join the multicast group G 109 by reverse tunneling an Internet Group Management Protocol (IGMP) membership report. The Mobile Station 303 also uses the home address 322 as the source address for the multicast message packets sent to the multicast group G 109 through the reverse tunnel 328. Using the home address 322 of the home domain 102 as the source address for the multicast message packets sent to the multicast group G 109 through the reverse tunnel 328 contrasts with using the local source address 324 as the source address for multicast message packets sent to the multicast group 109 while the Mobile Station 303 is in its home domain 102.

The Home Agent (HA) 320 uses the Care-of Address (CoA) of the Mobile Station 303 in the visited domain 302 as the destination address of the outer header of each message packet to create a forward tunnel. The Foreign Agent (FA) 314 uses the address of the Home Agent (HA) 320 as the destination address of the outer header of each message packet to create the reverse tunnel 328. In this manner, the multicast message packets sent over the reverse tunnel 328 remain encapsulated on the link between the Foreign Agent (FA) 314 and the Mobile Station 303 so that the home address 322 of the Mobile Station 303 and the multicast address of the multicast group G 109 remain invisible to the other devices in the visited domain 302. Even when the reverse tunnel 328 terminates at the Foreign Agent (FA) 314 in the visited domain 302 instead of at a colocated Care-of Address (CoA), the multicast address of the multicast group G 109 remains invisible to other devices on the same subnet 310 as the Mobile Station 303. The multicast address of the multicast group G 109 remains invisible to other devices on the same subnet 310 because tunneled multicast message packets are encapsulated on the link between the Foreign Agent 314 and the Mobile Station 303.

Figure 4:
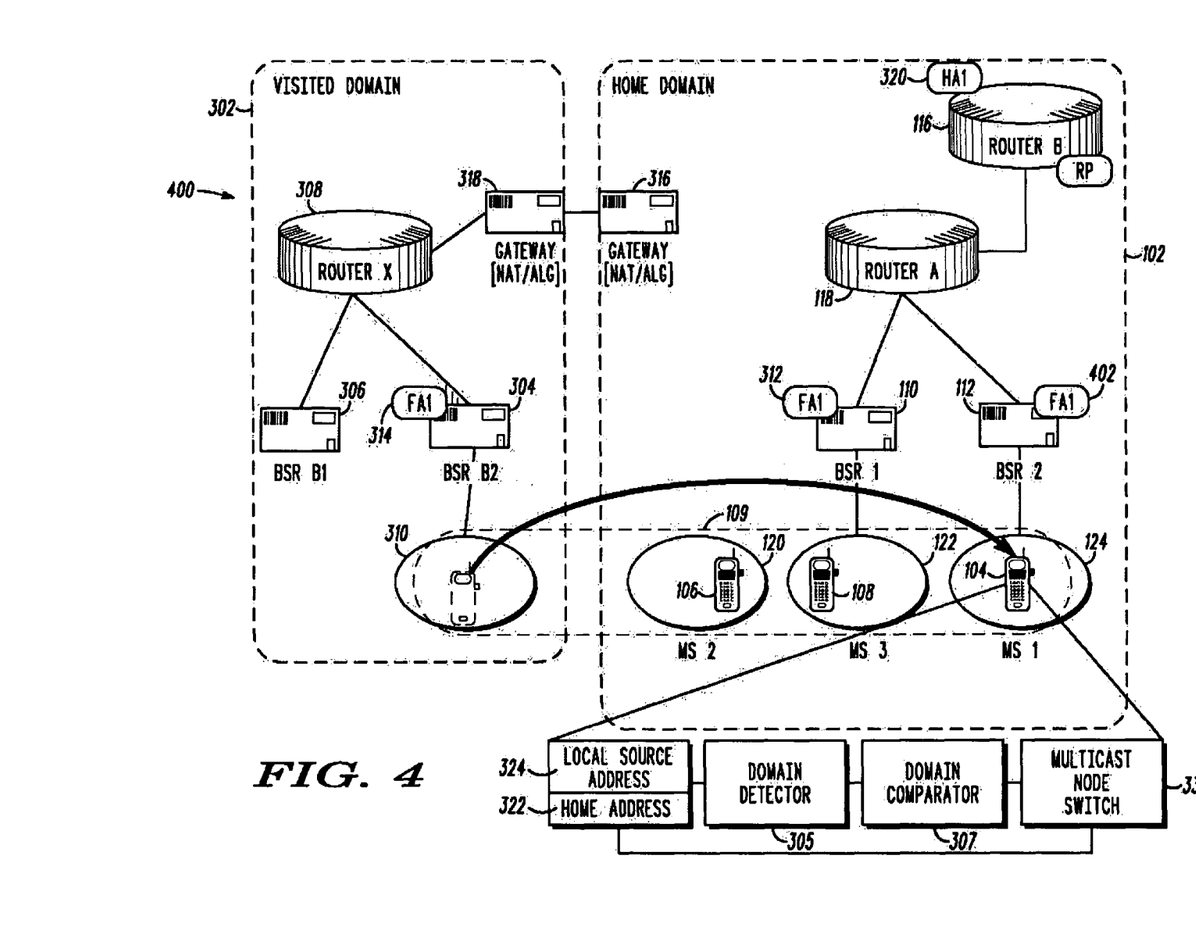
FIG. 4 illustrates a diagram of a Mobile Station that enters its home domain from a visited domain.

Conversely, the Mobile Station 303 may enter the home domain 102 from the visited domain 302 as illustrated in FIG. 4. FIG. 4 illustrates a diagram 400 of a Mobile Station that enters its home domain from a visited domain. Shown in FIG. 4 are a home domain 102, a visited domain 302, Mobile Stations 303, 106, and 108, a multicast group 109, a domain detector 305, Base Station Routers (BSR) 110, 112, 304, and 306, a domain comparator 307, multicast routers 116, 118, and 308, sectors or subnets 120, 122, 124, and 310, Foreign Agents (FA) 312 and 314, gateways or firewalls 316 and 318, a Home Agent (HA) 320, a home address 322, a local source address 324, and a multicast mode switch 326.

In FIG. 4, the domain detector 305 detects that the Mobile Station 303 is no longer connected to the visited domain 302, for example, by receiving the identifier of the subnet/cell/sector 124 in the home domain 102 to which the Mobile Station 303 is connected over a broadcast channel of the telecommunication system. The identifier of the subnet/cell/sector 124 to which the Mobile Station 303 is connected identifies the home domain 102. The domain detector 305 then sets the previous domain equal to the visited domain 302 that was formerly the current domain and replaces the current domain with the home domain 102 detected by the domain detector 305.

The domain comparator 307 receives the current domain from the domain detector 305 and compares the previous domain with the current domain to generate a comparison result. The comparison result indicates whether the previous domain is the home domain or a visited domain, whether the current domain is the home domain or a visited domain, and whether the previous domain is identical to the current domain.

The multicast mode switch 326 receives the comparison result from the domain comparator 307 and switches between the home address 322 and the local source address 324 received from the Foreign Agent (FA) as a function of the comparison result to select a source address for communicating with the multicast group G 109. For example, if the comparison result indicates that the current domain is another visited domain that is outside the home domain 102, then the Mobile Station 303 registers with a new Foreign Agent (FA) in the current domain and creates another reverse tunnel to the Home Agent (HA) 320 using the home address 322 of the Mobile Station 303 in the same manner as described above for the first visited domain 302.

If the comparison result indicates that the current domain is the home domain 102 and the previous domain is the visited domain 302, then the multicast mode switch 326 immediately switches from the home address 322 back to the local source address 324 and rejoins the multicast group 109, for example, via the Base Station Router (BSR) 112 using the local source address 324.

The Mobile Station 303 may rejoin the multicast group 109 locally, without the intervention of the Foreign Agent (FA) 312. As a result, multicast packets are sent to the Mobile Station 303 in non-encapsulated form, and the local source address 324 is visible to other devices in the home domain 102. Because the local source address 324 is received from the Base Station Router (BSR) 112 in the home domain 102, it may be assumed that the local source address 324 does not conflict with multicast addresses assigned in the home domain 102. The multicast mode switch 326 may be implemented in the Mobile Station 303 according to standard Mobile Internet Protocol (MIP) programming techniques without changing existing functions in other components supporting the multicast group in the telecommunication system. However, changes to existing functions in other components supporting the multicast group in the telecommunication system may be made to practice various embodiments of the method of switching between multicast modes described above within the scope of the appended claims.

In one embodiment, a method includes steps of:

(a) assigning a local source address to a mobile station in a telecommunication system wherein the telecommunication system includes a home domain, a visited domain, and a multicast group;

(b) assigning a home address registered in the home domain to the mobile station;

(c) detecting a current domain of the mobile station;

(d) comparing the current domain of the mobile station with a previous domain of the mobile station to generate a comparison result; and (e) switching between using the local source address and the home address to select a source address as a function of the comparison result for communicating with the multicast group.

Figure 5:
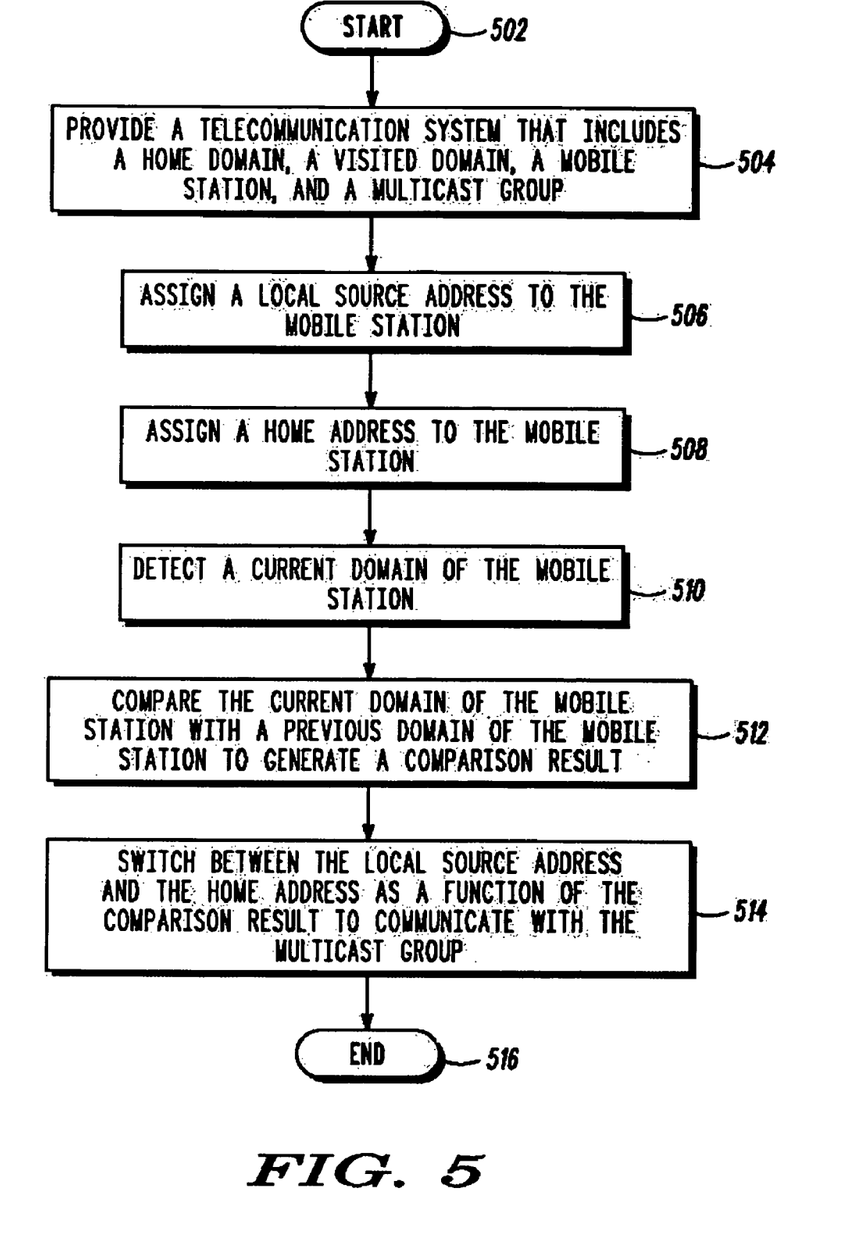
FIG. 5 illustrates a flow chart for the method of switching automatically between multicast modes as illustrated in FIGS. 3 and 4.

FIG. 5 illustrates a flow chart 500 for a method of switching automatically between the multicast modes illustrated in FIGS. 3 and 4.

Step 502 is the entry point of the flow chart 500.

In step 504, a telecommunication system is provided that includes a home domain, a visited domain, a Mobile Station (MS), and a multicast group. For example, the telecommunication system may be a Mobile Internet Protocol (MIP) telecommunication system.

In step 506, a local source address is assigned to the Mobile Station for joining the multicast group when the Mobile Station connects to a subnet in the home domain. The local source address may change as the Mobile Station moves from one subnet or cell or sector to another within the home domain.

In step 508, a home address is assigned to the Mobile Station. The home address may be used by the Mobile Station for joining the multicast group when the Mobile Station connects to a subnet in the visited domain. The Mobile Station uses the home address for unicast Internet Protocol (IP) message traffic and to set up a forward tunnel and a reverse tunnel to a Home Agent (HA) in the home domain according to well-known Mobile Internet Protocol (MIP) techniques.

In step 510, the current domain of the Mobile Station is detected. The current domain may be detected, for example, by receiving the identifier of the subnet to which the Mobile Station is connected over a broadcast channel of the telecommunication system and extracting the current domain from the subnet identifier. Alternatively, the current domain may be detected by transmitting a query from the Mobile Station to a Foreign Agent or to another entity inside the current domain, or by transmitting a request from the Mobile Station to associate with a subnet of the current domain according to well-known techniques. The Mobile Station obtains information about the current domain as part of the association of the Mobile Station with a subnet of the current domain. A query from the Mobile Station may be used when there is no risk of conflict with the multicast address of the multicast group G 109 beyond the home domain of the Mobile Station. This may be the case when the administrative scope of the multicast address of the multicast group G 109 does not correspond to the Internet Protocol domain boundary of the home domain. If the response to the query indicates that the multicast address of the multicast group the multicast group G 109 may be used on the current subnet without risk of conflict, then the Mobile Station proceeds to communicate with the multicast group G 109 as it would in its home domain. On the other hand, if the response to the query indicates that the multicast address of the multicast group G 109 may not be used on the current subnet without risk of conflict, then the Mobile Station proceeds to communicate with the multicast group G 109 as it would in a visited domain.

In step 512, the current domain is compared to the previous domain to generate a comparison result. The previous domain is identical to the current domain before a change in domain is detected. For example, the Mobile Station may initially set the previous domain equal to the home domain. When a current domain is detected that differs from the previous domain, a comparison result is generated, and the previous domain is set to the current domain. The comparison result indicates a change in domain when the Mobile Station roams from the home domain into the visited domain and when the Mobile Station enters the home domain from the visited domain. The comparison result may also indicate a succession of visited domains, for example, when the Mobile Station that has a home domain in the United States roams between several visited domains in Canada.

In step 514, the Mobile Station switches between the local source address and the home address to select a source address as a function of the comparison result for communicating with the multicast group. For example, the Mobile Station switches between the local source address and the home address when the comparison result indicates that the current domain differs from the previous domain and the previous domain is identical to the home domain. In other words, the Mobile Station has roamed from the home domain into a visited domain. In this case, the Mobile Station immediately switches from the local source address to the home address. The home address may then be used to set up a forward tunnel and/or a reverse tunnel or other appropriate device to rejoin the multicast group from the visited domain. When the reverse tunnel is established, multicast message packets may be reverse tunneled from the Mobile Station to the Home Agent (HA). When the forward tunnel is established, multicast message packets may be tunneled from the Home Agent to the Mobile Station.

Alternatively, the multicast mode switch immediately switches from the home address to the local source address when the comparison result indicates that the current domain differs from the previous domain and that the current domain is identical to the home domain. In other words, the Mobile Station has entered the home domain from the visited domain, which may be only one visited domain or a succession of several visited domains outside the home domain. The Mobile Station may then transmit a request to the multicast router to join the multicast group in the home domain using the local source address.

Step 516 is the exit point of the flow chart 500.

The Mobile Station may rejoin the multicast group using the home address in a forward tunnel and a reverse tunnel when the comparison result indicates that the current domain differs from the previous domain and that neither the previous domain nor the current domain is identical to the home domain. In other words, the Mobile Station has moved from a visited domain into another visited domain. A forward tunnel and a reverse tunnel may be set up in the current domain by registering with a Foreign Agent in the current domain in the same manner as in the previous domain.

Although the flowchart description above is described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

As may be appreciated from the above, seamless mobility across multicast domains is provided by automatically switching between the local source address and the home address upon detecting when the Mobile Station roams between the home domain and the visited domain.

The specific embodiments and applications thereof described above are for illustrative purposes only and do not preclude modifications and variations that may be made within the scope of the following claims.

What is claimed is:

1. A method comprising steps of:
   (a) assigning a local source address to a mobile station in a telecommunication system wherein the telecommunication system includes a home domain, a visited domain, and a multicast group wherein the multicast group is identified by a multicast address;
   (b) assigning a home address to the mobile station;
   (c) detecting a current domain of the mobile station wherein the current domain is only one of the home domain and the visited domain and wherein the current domain is detected using a subnet identifier that identifies the current domain; and
   (d) responsive to detecting the current domain, switching between using the local source address and using the home address as a source address when sending a packet from the mobile station to the multicast address for communicating with the multicast group and when a comparison result indicates that the mobile station roams between the home domain and the visited domain, wherein using the local source address as the source address for the packet when the current domain is the home domain and using the home address as the source address for the packet when the current domain is the visited domain.

2. The method of claim 1 wherein step (c) comprises receiving the subnet identifier over a broadcast channel of the telecommunication system.

3. The method of claim 1 wherein step (c) comprises transmitting a request from the mobile station to associate with a subnet of the current domain to determine the current domain.

4. The method of claim 1 further comprising sending a request to a multicast router in the home domain from the mobile station to join the multicast group by reverse tunneling the request when the current domain is the visited domain.

5. The method of claim 4 further comprising reverse tunneling the packets from the mobile station to the Home Agent when the current domain is the visited domain.

6. The method of claim 1 wherein the comparison result indicates that the mobile station roamed from the visited domain to the home domain.

7. The method of claim 1 wherein the comparison result indicates that the mobile station roams from the home domain to the visited domain.

8. A mobile station for a telecommunication system comprising:
- a local source address assigned to the mobile station wherein the telecommunication system includes a home domain, a visited domain, and a multicast group wherein the multicast group is identified by a multicast address;
- a home address assigned to the mobile station;
- a domain detector for detecting a current domain wherein the current domain is only one of the home domain and the visited domain wherein the current domain is detected using a subnet identifier that identifies the current domain;
- a domain comparator for comparing the current domain with a previous domain to generate a comparison result to determine when the mobile station roams between the home domain and the visited domain; and
- a multicast mode switch coupled to the domain detector for switching between the local source address and the home address to select a source address when sending a packet to the multicast address for communicating with the multicast group by selecting the local source address as the source address when the comparison result indicates that the current domain is the home domain and selecting the home address as the source address when the comparison result indicates that the current domain is the visited domain and wherein the multicast mode switch switches from the home address to the local source address when the comparison result indicates that the current domain is identical to the home domain.

9. The mobile station of claim 8 wherein the multicast mode switch transmits a request to a Home Agent in the home domain from the mobile station to join the multicast group, the request using the local source address when the current domain is the home domain and the request using the home address when the current domain is the visited domain.

10. The mobile station of claim 8 wherein the multicast mode switch reverse tunnels the request when the current domain is the visited domain and does not reverse tunnel the request when the current domain is the home domain.

* * * * *

UNITED STATES PATENT AND TRADEMARK OFFICE
CERTIFICATE OF CORRECTION

| | |
|---|---|
| PATENT NO. | : 7,817,599 B2 |
| APPLICATION NO. | : 11/235503 |
| DATED | : October 19, 2010 |
| INVENTOR(S) | : Dorenbosch et al. |

It is certified that error appears in the above-identified patent and that said Letters Patent is hereby corrected as shown below:

On the Title Page, at (73) Assignee: delete "Motorola-Mobility, Inc., Libertyville, IL (US)" and insert therefor -- Motorola, Inc., Schaumburg, IL (US) --.

On the Title Page, in Field (58), under "Field of Classification Search", in Column 1, Line 2, delete "455," and insert -- 445, --, therefor.

Signed and Sealed this
Thirty-first Day of January, 2012

David J. Kappos
*Director of the United States Patent and Trademark Office*